No. 720,444. PATENTED FEB. 10, 1903.
W. E. KOCH.
CORN HARVESTER.
APPLICATION FILED NOV. 23, 1901.
NO MODEL. 8 SHEETS—SHEET 1.

WITNESSES:
W. R. Edelen,
Amos W. Hart

INVENTOR
William E. Koch,
BY Munn & Co,
ATTORNEYS

No. 720,444. PATENTED FEB. 10, 1903.
W. E. KOCH.
CORN HARVESTER.
APPLICATION FILED NOV. 23, 1901.
NO MODEL. 8 SHEETS—SHEET 6.

WITNESSES:
W. R. Edelen.
Amos W Hart

INVENTOR
William E. Koch
BY
ATTORNEYS

No. 720,444. PATENTED FEB. 10, 1903.
W. E. KOCH.
CORN HARVESTER.
APPLICATION FILED NOV. 23, 1901.
NO MODEL. 8 SHEETS—SHEET 8.

WITNESSES:
W. R. Edelen
Amos W Hart

INVENTOR
William E. Koch.
BY Mount Co.
ATTORNEYS

UNITED STATES PATENT OFFICE.

WILLIAM E. KOCH, OF DUVALL, OHIO, ASSIGNOR OF ONE-HALF TO AARON P. KOCH, OF DUVALL, OHIO.

CORN-HARVESTER.

SPECIFICATION forming part of Letters Patent No. 720,444, dated February 10, 1903.

Application filed November 23, 1901. Serial No. 83,397. (No model.)

*To all whom it may concern:*

Be it known that I, WILLIAM E. KOCH, a citizen of the United States, residing at Duvall, in the county of Pickaway and State of Ohio, have made certain new and useful Improvements in Corn-Harvesters, of which the following is a specification.

My invention is in that class of machines which are adapted for cutting cornstalks in the field and binding them into shocks.

The features of novelty and improvement are hereinafter described and specifically indicated, reference being had to the accompanying drawings, in which—

Figure 1:
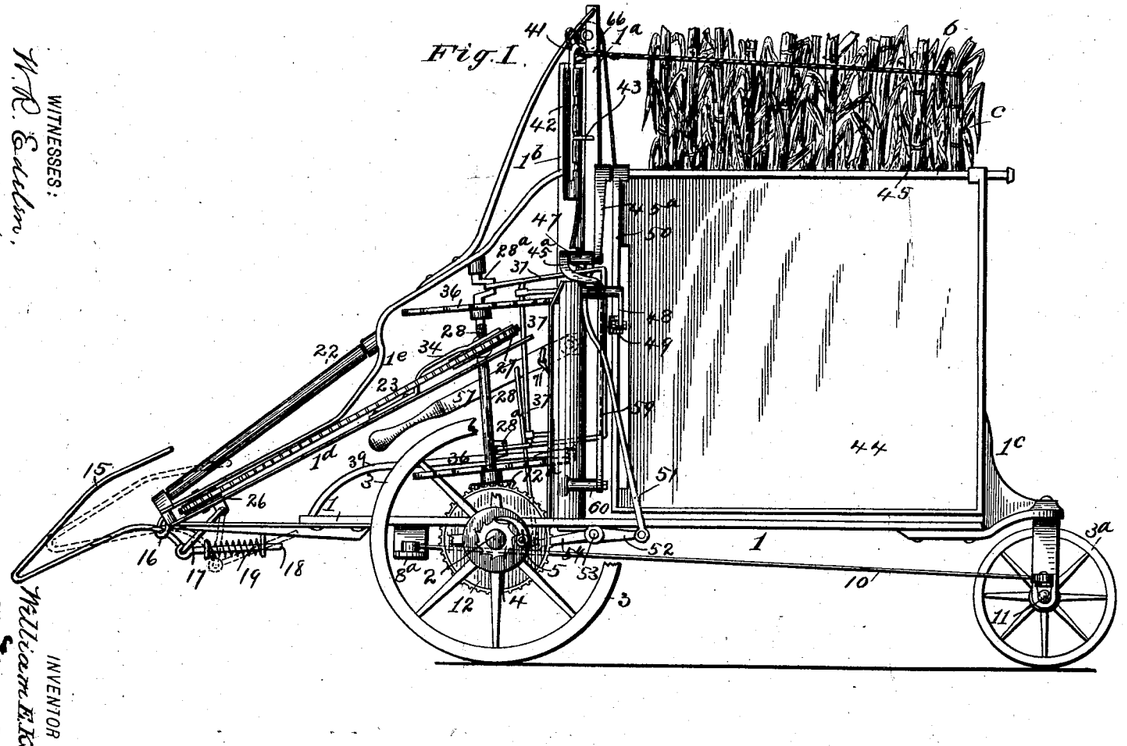
Figure 1 is a side elevation of the machine.
Figure 5:
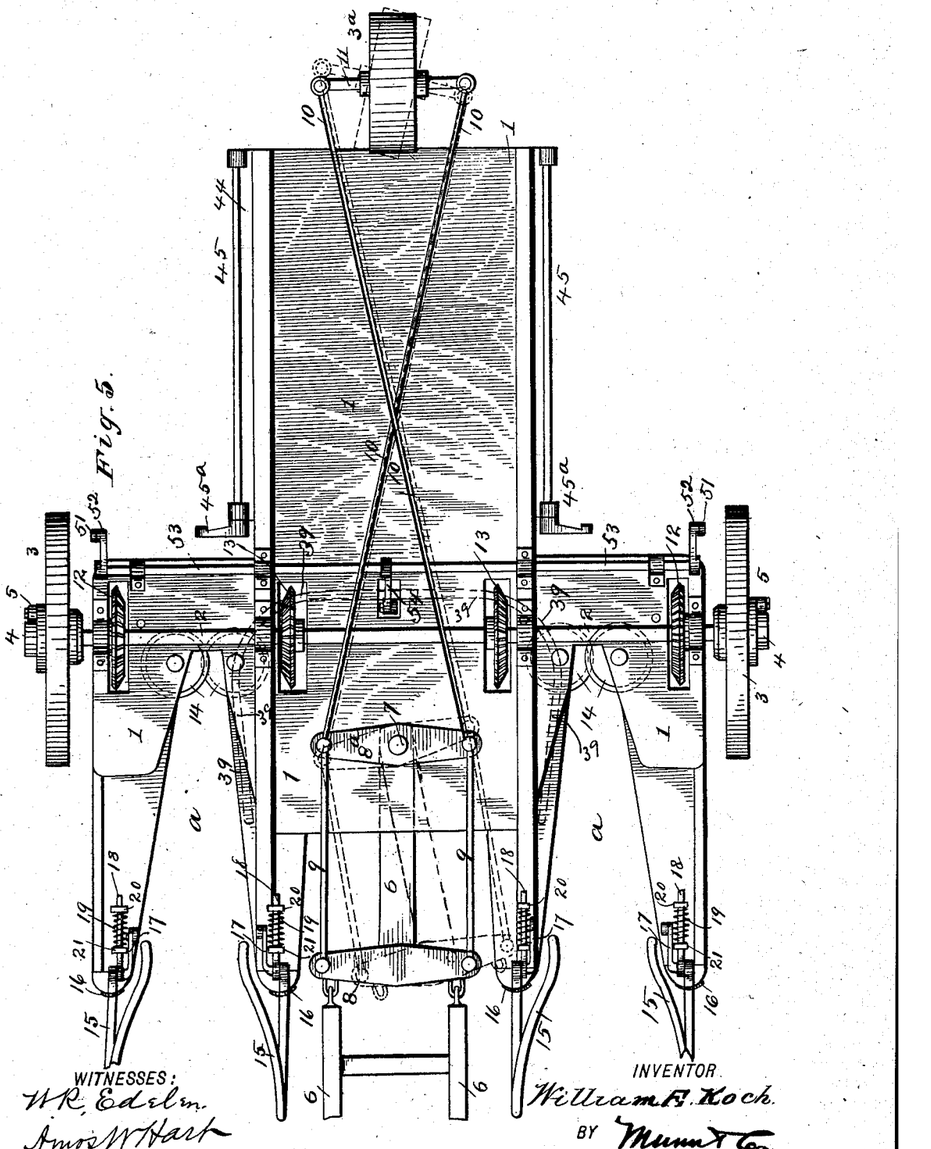
Fig. 5 is a bottom plan view, the mechanism for operating the side wings of the corn-discharging mechanism being omitted.

The frame of the machine consists of a horizontal platform 1, certain vertical posts or standards $1^a$ $1^b$ $1^c$, and forwardly and downwardly projecting cornstalk-guides $1^d$ and $1^e$. The said platform 1 is supported upon an axle 2, having transporting-wheels 3 and a rear caster-wheel $3^a$. (See especially Fig. 5.) The platform 1 is practically T-shaped, and the axle 2 underlies and is attached to the widest portion of the same. The axle 2 is rotatable in its bearings, it being provided, as shown in Fig. 1, with ratchet-wheels 4, which are fixed thereon and are engaged by pawls 5, pivoted to the hubs of the transporting-wheels 3. By this connection the axle rotates with the transporting-wheels and always with that one which travels faster. It is apparent that by throwing the pawls out of action the axle will not rotate with the wheels, and consequently operative mechanism will likewise be thrown out of gear.

Figure 2:
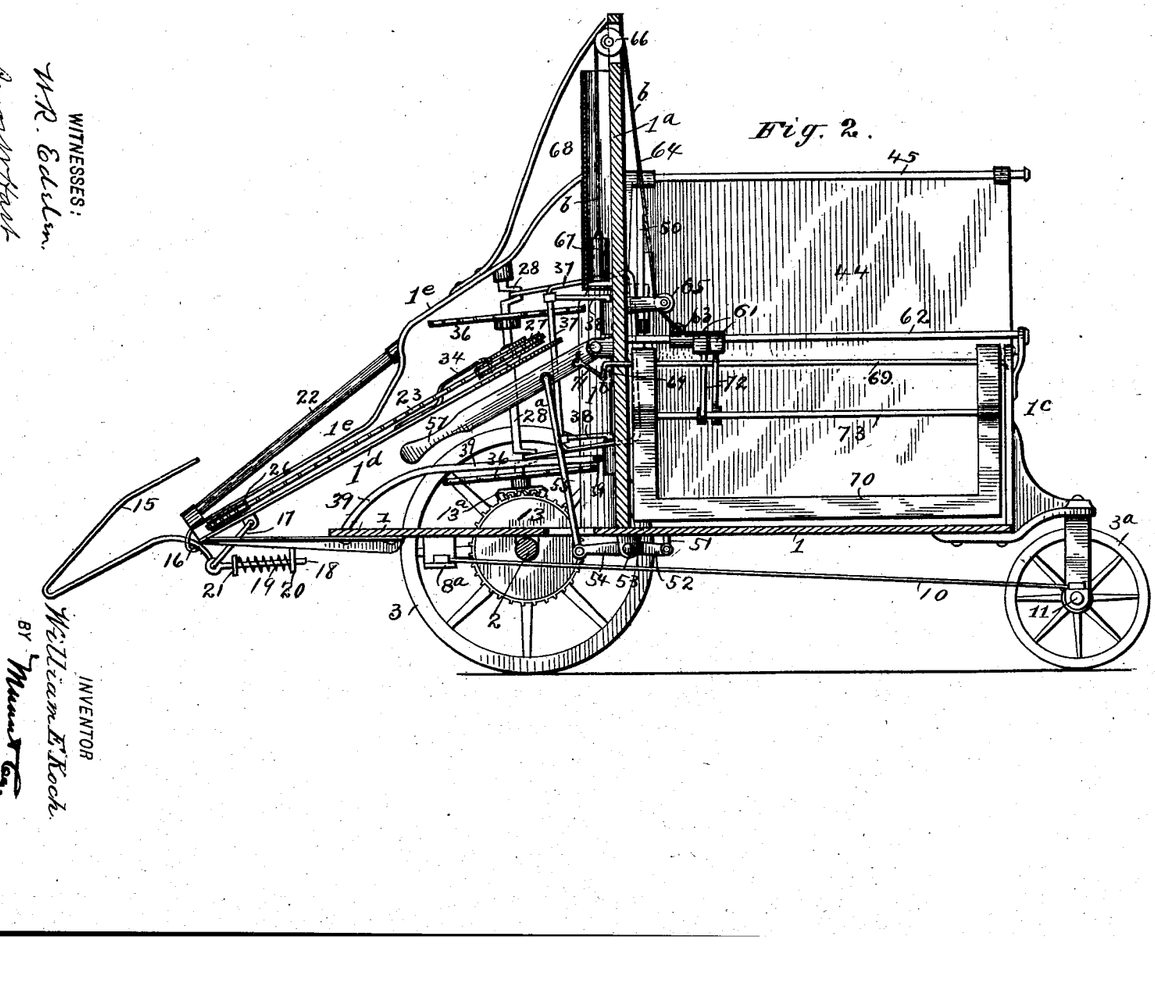
Fig. 2 is a central vertical section.
Figure 3:
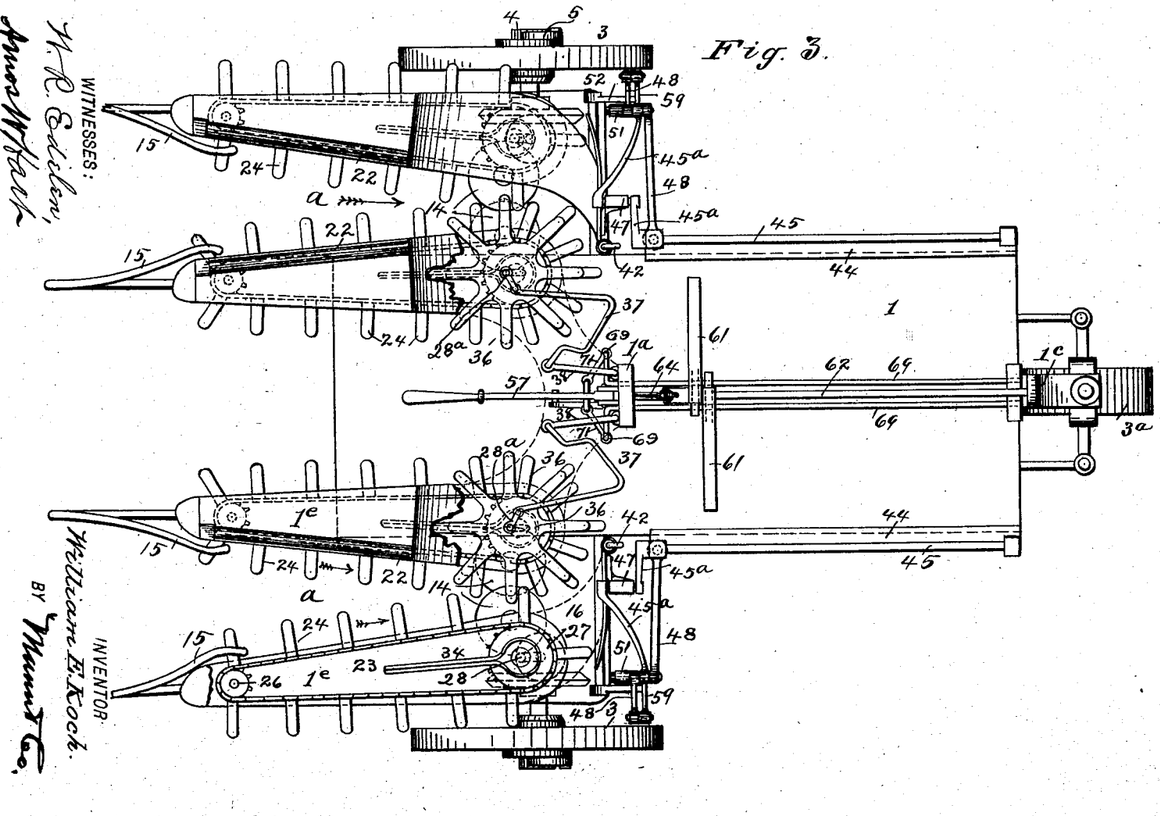
Fig. 3 is a plan view of the machine, save a part of one of the fixed corn-guides, which is in section.
Figure 11:
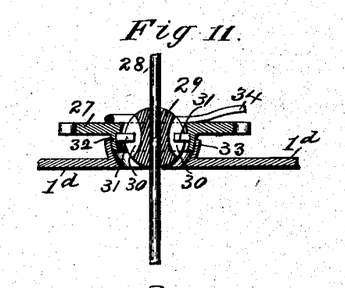
Fig. 11 is a section illustrating the ball-bearing for one of the sprocket-wheels upon which the endless chains of the corn-gathering mechanism run.
Figure 12:
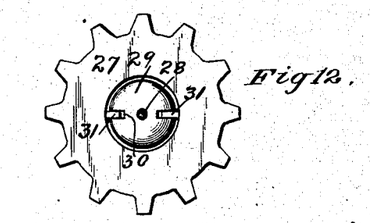
Fig. 12 is a plan view of the same parts.
Figure 13:
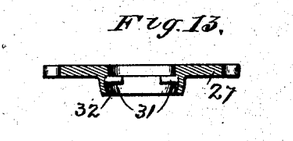
Fig. 13 is a section of the said sprocket-wheel.
Figure 14:
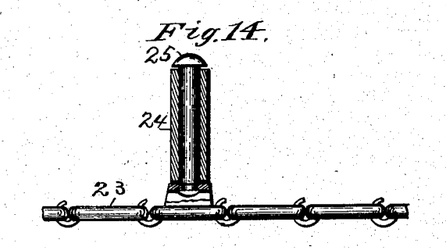
Fig. 14 is a plan view of a portion of one of the endless corn-gathering chains or belts, one of the fingers or prongs of the same being shown in section.

For guiding the machine I employ shafts 6, (see Figs. 5 and 6,) which are pivoted to the platform 1 at 7 and provided with a front cross-bar 8, which is rigidly attached thereto. Parallel rods 9 connect the ends of such cross-bar with the corresponding portion of a rear cross-bar $8^a$, which is mounted on the pivot 7 of the shafts 6. Such rear cross-bar $8^a$ is further connected by crossed rods 10 with the axle-arms 11 of the rear or caster wheel $3^a$. By this arrangement it is apparent that when the shafts 6 are deflected in one direction the caster-wheel will be turned to a corresponding angle in the opposite direction, as illustrated in dotted lines in Fig. 5, and in this manner the machine will describe a considerable curve in turning. As further shown in Fig. 5, a series of beveled gears 12 and 13 are keyed upon the axle 2 and project through slots in the platform 1. These gears impart rotary motion to the mechanism or parts by which the cornstalks are carried backward against the cutters or knives 14 and then backward on the rear portion of the platform 1, where they are bound into a shock and finally discharged. Before describing such mechanism I will describe the parts which first come into action in the operation of the machine. I refer to the devices 15, which are arranged at the front end or angle formed by the platform and the inclined corn-guides $1^d$ and $1^e$. The said devices 15 serve to lift and deflect cornstalks which have become bent laterally or "lodged." They consist of a rod bent at an acute angle, one portion sliding in a keeper 16 and its downwardly-curved rear end being jointed to a swinging rod 17 and a rod 18, which is encircled by a spiral spring 19. The curved portion of the device 15 slides freely in the keeper 16, and as the former is projected downward it tends to maintain the forwardly-extended position. It is, however, forced forward and held projected by the positive action of the spring 19, which abuts a bracket 20, in which the guide-rod 18 slides, and a collar 21, fixed on the front portion of said rod. The swinging rod 17 serves to support and guide the device, as will be readily understood. It is apparent that by this arrangement and combination of parts I provide a device which serves to pick up lodged cornstalks, and in case of meeting with too great obstruction it is pushed back, as shown by dotted lines Fig. 1, so as to avoid injury or breakage. As shown in Fig. 3, the free upper portions of the corn-lifters are deflected laterally and inward, so as to be further effective in guiding the cornstalks laterally and into the guideway $a$, between the fixed guides $1^d$ $1^e$. As shown in Fig. 3, there are two such guideways, so that the machine is adapted for acting upon two rows of cornstalks simultaneously. In fact, the gathering, cutting, and packing apparatus are practically duplicated on the two sides of the machine, and the description of one, therefore, suffices for both. The guideways or spaces $a$ are practically V shape, the narrowest portion being at the rear and the widest portion at the front. As the cornstalks enter these spaces they are crowded inward and pressed together, and thus tend to bend over laterally, and to relieve in a degree the friction due to this I arrange rollers 22, adjacent to the inner edges of the opposite guides, the same being supported rotatably upon shafts that extend at an angle of about forty-five degrees from the front end of the fixed guides $1^e$ to the raised rear portion of the latter, as shown best in Fig. 2. To carry or force backward the cornstalks directly they have entered the spaces $a$, (shown in Fig. 3,) I employ endless traveling chains 23, which are provided with a series of lateral fingers 24, whose construction in detail is illustrated in Fig. 14—that is to say, the chains 23 may be such as are ordinarily employed on harvesters and other machines where sprocket mechanism is utilized; but the fingers 24 consist of a rigid axle or arm 25, upon which is mounted a roller adapted to rotate freely. It is apparent that by this construction and combination of parts the fingers 24, projecting into the guideway $a$, as shown, they will take into the pack or bundle of cornstalks compressed in the guideway and force the same backward in direction of the arrows, Fig. 3, and at the same time the friction of the fingers with the stalks will be relieved to a great degree and injury to the corn ears or stalks proper will also be avoided correspondingly. The chains 23 run on sprocket-wheels 26 and 27. (See Fig. 1, 2, and the lower portion of Fig. 3.) The smaller sprocket-wheel 26 is journaled in the apex of the stalk-guides $1^d$ and $1^e$, and the larger sprocket-wheel 27 is journaled on a vertical shaft, the arrangement being a peculiar one, in order to enable the wheel to rotate constantly in the same inclined plane (represented in Figs. 1 and 2) and which is at an angle to the shaft. To effect this, a spherical block or bearing 29 (see Fig. 11) is fixed on the shaft and provided with opposite lateral and vertical slots 30. The sprocket-wheel 27 is provided with opposite inwardly-projecting pins 31, which project into and work in said slots 30, so that as the shaft is rotated the bearing 29 carries the sprocket-wheel with it. The wheel is further provided with a downwardly-projecting and inwardly-curved flange 32, which works freely in a fixed and upwardly-projecting flange 33, formed on the fixed guide $1^d$. The wheel 27 is held in the position shown in Fig. 11 by means of a spring 34, which is attached to the fixed guide $1^d$ and provided with a loop or ring at its free end, as shown in Fig. 3, which loop rests free upon the wheel 27 and is in the same plane therewith. By this arrangement the sprocket-wheel 27 drives the chains 23 with practically the same effectiveness as if the wheels were arranged at right angles to the shafts. As the cornstalks are thus guided and carried backward into the spaces $a$, as the machine advances the rotary cutters 14 (see Figs. 3, 5, and 6) sever them a short distance above the ground, and the severed portions are then carried laterally and backward, as will be further described. The said cutters 14 constitute an important element of the machine, and their arrangement is such that they operate effectively without the aid of any driving mechanism—that is to say, they are arranged in a horizontal plane, one slightly overlapping the other, so as to rotate and act practically with a shear cut as the stalks are forced against them. It will be seen that they are located at the rear end or apex of the V-shape guideways $a$ and that the stalks are successively forced against and severed by them.

I will now describe the means for forcing the severed cornstalks laterally and backward onto the rear portion of the platform 1, where they are to be bound into a shock and finally discharged as such.

Figure 6:
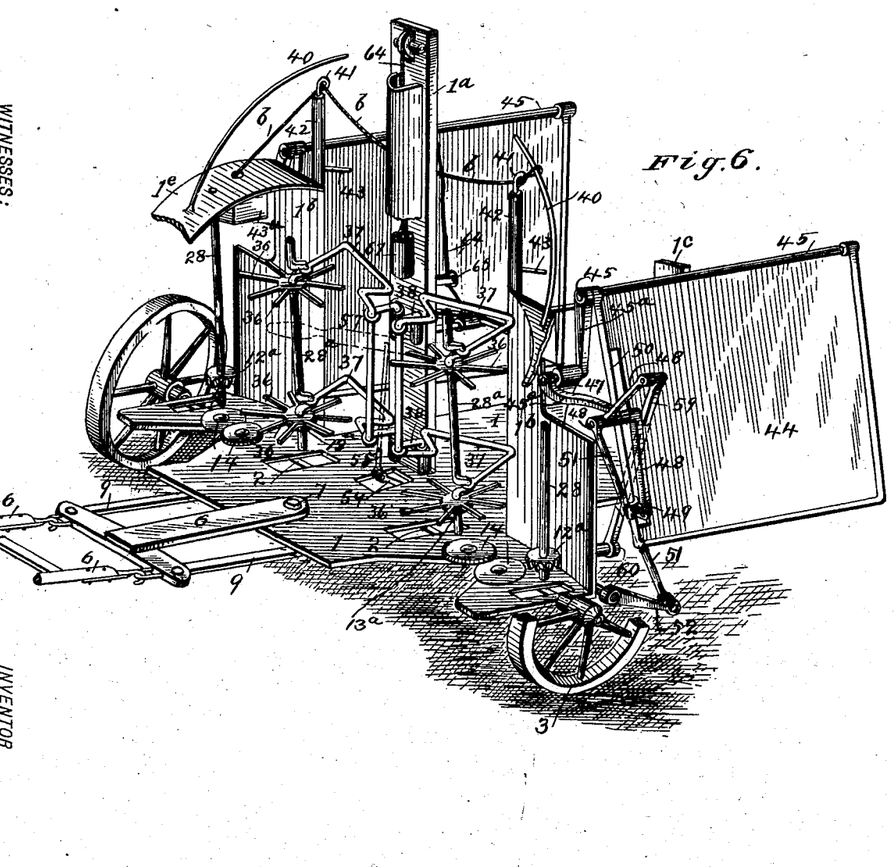
Fig. 6 is a perspective view of a portion of the machine, many parts being omitted for the sake of clearer illustration of the cornstalk cutters, carriers, and packers, together with a portion of the shock-discharging apparatus.
Figure 7:
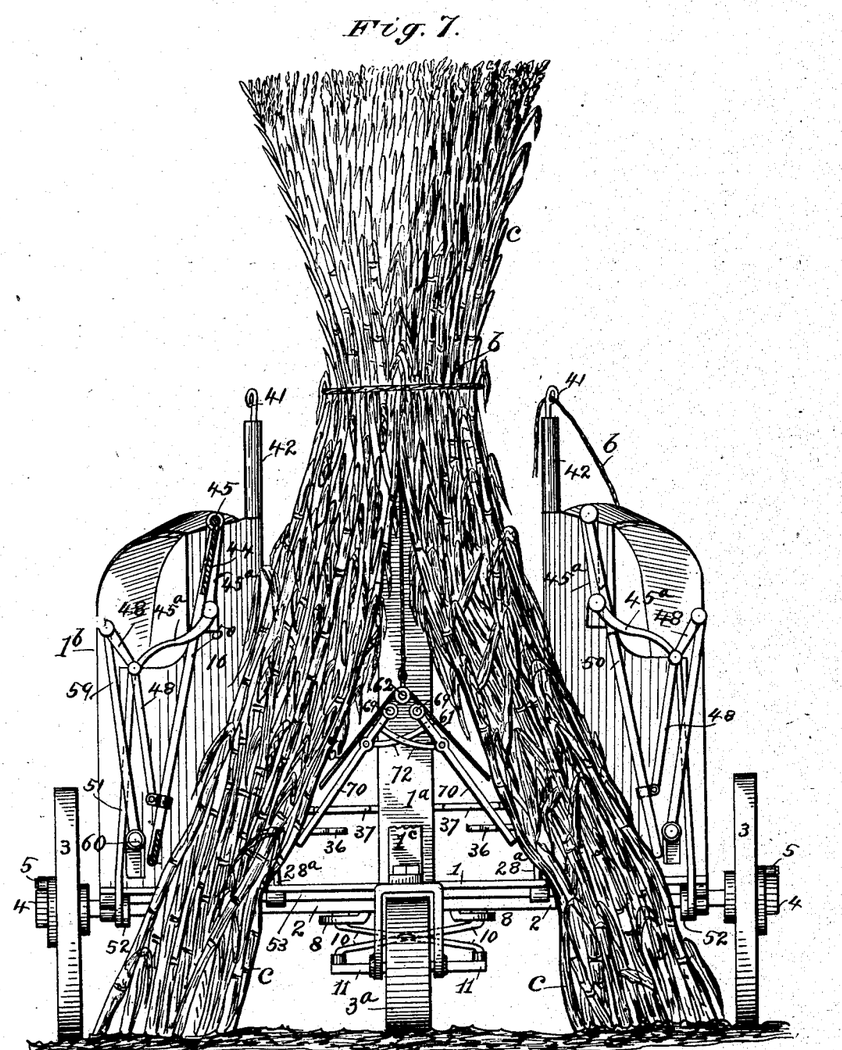
Fig. 7 is a rear view of the machine, a shock of corn being shown in the position in which it is discharged from the machine.
Figure 8:
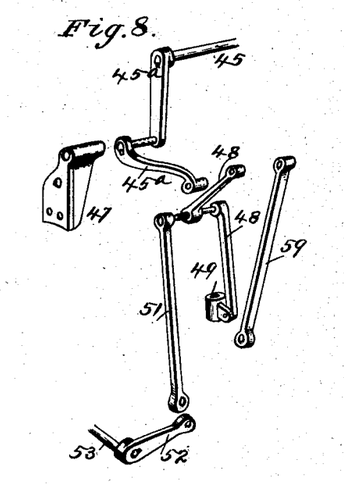
Fig. 8 is a perspective view of parts for operating the side wings constituting a portion of the shock-discharging mechanism, the said parts being shown detached.

The beveled gears 12 and 13, which are keyed on the axle 2, (see Fig. 5,) mesh, respectively, with beveled pinions $12^a$ and $13^a$, respectively, which are mounted on vertical shafts 28 and $28^a$, respectively. The shafts 28 are located nearest the respective transporting-wheels 3, and the shafts $28^a$ are provided with cranks and arranged parallel to shafts 28, but in line with the inner corn-guides $1^d$ and $1^e$. Each of these shafts 28 and $28^a$ carries a spherical block 29, (see Fig. 11,) and thus serves as a driver for an endless chain 23, which is provided with lateral fingers 24 for forcing the top portions of the stalks backward, as before described. The shafts 28 have no other function than to drive the outer chains 23. The crank-shaft $28^a$ has this function and in addition two others—namely, it is provided with two star-wheels 36—that is to say, disks provided with radiating fingers or arms, (see Figs. 1, 3, and 6,) and its cranks are connected with devices 37, which serve as pushers for forcing the cornstalks rearward. It will be noted from Figs. 3 and 6 that the star-wheels 36 are opposite the inner angles of the standards $1^b$ and that they serve to move the severed stalks away from the cutters 14 and inward past the angle of the said standards. The pushers 37 then come into action and force the stalks directly backward. The details of construction, arrangement, and operation of the said pushers 37 are as follows: They are preferably constructed of rods having upper and lower horizontal bends, which are directly connected on one side with the cranks of the shafts $28^a$ and on the other by a vertical part which is journaled in and supported by swinging arms 38, the latter being journaled in suitable sockets fixed on the vertical central standard $1^a$. The horizontal portions of the pushers 37 are adapted to work in the space in front of and between the central standard $1^a$ and the side standard $1^b$. In other words, they are so arranged that when they make their rearward movement it is practically in direct line with the spaces between the standards, whereby they serve more effectively to push the corn directly backward onto the rear portion of the platform 1. As shown best in Fig. 3, the pushers 37 are bent at an acute angle and the angles project rearward, so that as the severed cornstalks are pushed inward past the standards $1^b$ by the star-wheels 36 the angles of the pushers engage the same and force them over toward the central portion of the platform. It will be seen that by the operation of the cranks of the shaft $28^a$ and the swinging arms or supports 38 the pushers 37 have practically a rotary reciprocating movement, whereby they are drawn forward and then pushed backward in such manner as to engage with the stalks carried toward and in front of them by the star-wheels 36. In other words, as the machine advances the standing stalks are severed and then carried backward by the star-wheels as well as laterally, and finally pushed backward upon the rear portion of the platform by the pushers 37. In this transit it is requisite that a guard be provided for the lower star-wheels, and for this purpose I arrange a rod 39, which is practically a semicircle (see dotted lines, Fig. 5, and full lines, Figs. 1 and 2) which extends rearward from the front portion of the platform over the inner disk cutters 14 and also over the lower star-wheels 36 and in front of the central standard $1^a$. This guard serves materially in directing the cornstalks rearward into the spaces between the standards $1^a$ and $1^b$. When the severed stalks arrive upon the rear portion of the platform 1, they are supported in vertical position while being pushed backward by new accessions until a sufficient quantity has accumulated to form a shock. The machine is then halted while the shock is being tied, after which the tied shock is discharged in the manner hereinafter described. The twine or cord $b$, by which the shock is tied, is arranged and supported as shown in Figs. 1 and 6— that is to say, the looped end of the cord is hung over a bent rod 40, (see Fig. 6,) which stands in a nearly-vertical position, and is then drawn through eyes formed on vertically-slidable rods 41, which are held in guides 42, forming extensions of the vertical standard $1^b$. As shown in Fig. 1, these guides 42 are small cylinders having a longitudinal slot and provided with a series of notches in one edge of the same. The slidable rods 41 are provided with a lateral handle 43, by means of which they are adjusted vertically to any required height and by which they are also locked in any required adjustment, the arm entering the notches, as shown in Fig. 1. The cord or twine $b$ is drawn off from a box $43^a$, (see Fig. 6,) which is suitably supported on the frame, preferably on the rear extension of one of the corn-guides $1^c$. It will be seen that as the severed stalks are forced rearward by the pushers 37 the cord or twine $b$ will be drawn out, as shown in Fig. 1, so that a sufficient length will be provided for tying the shock. A man standing upon the platform in front of the central standard $1^a$ is able to conveniently sever the cord on the left side and to draw the loop off from the rod 40 on the right-hand side and to tie the severed portion tightly around the stalks. He then draws off another length of twine and attaches it to the arm 40, as before. The next step is to discharge the corn-shock, which is done, when the machine is again started for cutting. As shown in several figures, broad pendent wings 44 are arranged on opposite sides of the rear portion of the platform for the purpose of holding the lower portions of the stalks on the latter while being pushed rearward and tied, as before described. These wings 44 may be constructed of any light and duly rigid material, preferably thin sheet metal. They are suspended and adapted to swing from horizontal bars 45, forming fixed attachments of crank-levers $45^a$, (see Figs. 6 and 8,) which are journaled in brackets 47, fixed on the rear sides of the standard $1^b$. (See Figs. 4 and 6.) A second crank-lever 48 is journaled in the lower arm of lever $45^a$ and provided at its lower end with a cuff or sleeve 49, which is adapted to slide upon the vertical rod 50, forming a part of the frame of the wing 44. A pitman or rod 51 connects the engaging ends of crank-levers $45^a$ and 48 with the arm 52 of a rock-shaft 53, which is journaled beneath the platform and provided centrally with an arm 54. Said arm is connected by rod 55 with a hand-lever 57, which is pivoted upon the vertical standard 1ᵃ. It is apparent therefore that by moving said lever 57 up or down the shaft 53 will be rocked correspondingly and that through the medium of the rod 51 the crank-levers 48 and 45ᵃ will be vibrated. The lever 48 has an arm extending upwardly at an angle of forty-five degrees (see Fig. 8) and is fulcrumed in a rod 59, which is fulcrumed at 60 on the standard 1ᵇ. When the hand-lever 57 is depressed, the rod 51 throws up the crank-levers 45ᵃ and 48, whereby two results follow—namely, the horizontal rod 45, attached to crank 45ᵃ, is thrown inward, whereby the top portion of the wing 44 is carried inward toward the platform 1, and at the same time the lever 48, through the medium of this sliding sleeve 49, throws the lower portion of the wing inward, so that as a whole the wing assumes a vertical position which adapts it to form one side of the passage or guideway in which the corn is received. Such position is shown in Figs. 1 to 4, and the open position of the said wings is shown in Figs. 6 and 7.

Figure 4:
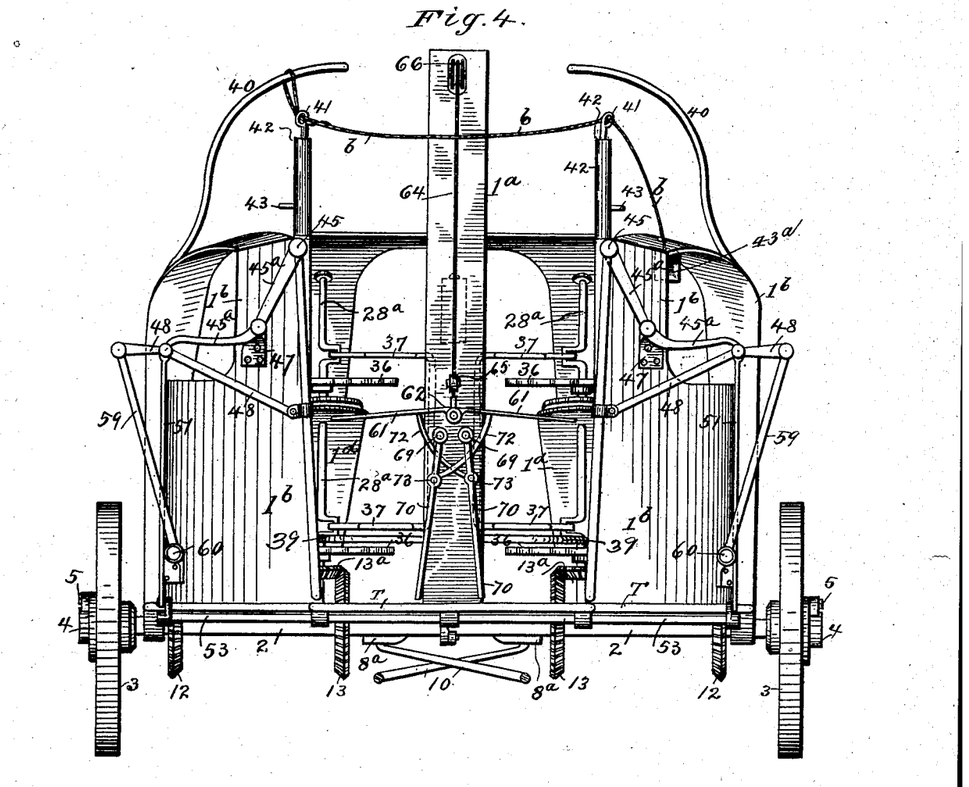
Fig. 4 is a rear end view omitting the rear transporting-wheel and certain of the driving-gears.
Figure 9:
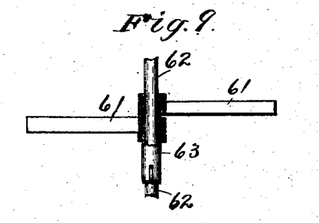
Figs. 9 and 10 are detail sectional views illustrating a portion of the stalk-packing mechanism.
Figure 10:
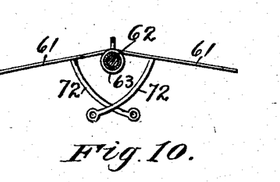

While the oscillating packers 37 push the cornstalks into the passageways on the platform 1, it is necessary to provide some means whereby the stalks will be compressed so as to form a compact bundle or shock. For this purpose I employ slidable arms 61, (see Figs. 3, 4, and 7,) the same being arranged to slide upon a horizontal rod 62, which is fixed in the front and rear standards 1ᵃ and 1ᶜ a short distance above the platform 1. It will be seen that this rod is arranged midway between the two wings 44 and parallel thereto. The said arms (see Fig. 9) are journaled upon a sleeve 63, which is adapted to slide on the rod 62. A cord 64 is connected with said sleeve 63 (see Fig. 2) and passes over pulleys 65 and 66 and is connected with a weight 67, which slides vertically in a guideway 68. The pulley 66 is located at the top of standard 1ᵃ, and the pulley 65 is arranged midway of the standard and just above the rod 62, that supports the said arms 61. It is apparent that the function of the weight 67 is to hold the arms 61 normally close to the standard 1ᵃ and to resist outward pressure tending to force the arms away from the standard. The arms are held nearly horizontal, as shown in Fig. 4, when cornstalks are being pushed back by the packers 37, and it is obvious that the arms will recede from the standard 1ᵃ as the quantity of stalks increases. When the quantity is sufficient to nearly fill the spaces or guideways between the rod 62 and the side wings 44, the machine is halted and the operator ties the binding-corn b around the same, as before described. Since the tops of the stalks filling both the guideways are tied together, it is apparent that the shock thus formed is bifurcated and straddles the rod 62. It is now necessary to discharge the shock from the platform 1, and this is effected in the following manner: Two crank-shafts 69 (see Figs. 2 and 3) are arranged parallel to the rod 62, upon which the arm 61 slides, and journaled in the standards 1ᵃ and 1ᶜ. As shown in Figs. 4 and 7, these shafts 69 are located in a plane below the rod 62, and upon them are rigidly fixed skeleton frames 70, whose function is to aid in the discharge of the cornstalks. The front ends of the shafts 69 (see Fig. 3) are formed with crank-arms, which are connected by links 71 with the lever 57. It will now be apparent that when the said lever is vibrated the shafts 69 will be rocked and that the shock-discharging frames 70 will be vibrated or swung laterally to a corresponding degree. In Fig. 7 the dischargers 70 are shown thrown outward to an angle of forty-five degrees and the wings 44 to a lesser degree, whereby the butts of the stalks composing the shock c are forced laterally off the platform 1 through the openings provided between the latter and the wings 44, whereupon the shock slides down by gravity into the position shown in Fig. 7—that is to say, with its butt resting upon the ground. The machine passing forward, the shock is left standing and braced in vertical position.

It is apparent from the foregoing description that the dischargers 70 and the wings 44 are vibrated together by one and the same means—to wit, the hand-lever 57—and that when the dischargers are in vertical position the wings 44 are also, and, contrariwise, when the wings are swung outward the dischargers are also; but it is apparent that the retarder 61 must operate oppositely to the dischargers 70, or, in other words, that when the dischargers are closed or hang in vertical position the retarders 61 must be extended horizontally, or nearly so, as shown in Fig. 3, in order to perform their function. As a most convenient means for effecting this operation the retarders 61 are connected by rigid arms 72 (see Figs. 2 and 7) with the dischargers 70, the said arms crossing each other and being pivoted at their lower ends upon the dischargers 70. This connection may be formed as shown in Fig. 2, where the arms are journaled at their lower ends upon arms 73, extending horizontally and forming part of the skeleton frames of the dischargers 70. It is apparent that by this arrangement when the shafts 69 are rocked and the shock-dischargers 70 are drawn inward the retarder 61 will be raised, and vice versa. By the above-described apparatus the discharge of the shocks may be effected with ease and despatch without the aid of any manual exertion save the operation of the lever 57. It is apparent that so soon as the shock is discharged, the lever 57 being again depressed, the dischargers 70 are brought again to the vertical position and the arms 61 again extended in readiness to operate as before to retard and thereby compact the stalks received upon the platform as the machine continues to advance. It is further apparent that the weight 67 will instantly draw the retarders 61 back to their normal position so soon as the shock *c* has been discharged. By such discharging mechanism I have overcome one of the great difficulties encountered by inventors and manufacturers in the construction of corn-harvesters.

I will briefly recapitulate the operation of the machine. As it advances the lifters 15, passing alongside a row of standing corn, they operate to guide the same into the V-shaped passage-ways *a*, (shown in Fig. 3,) and in case any are lodged they lift the same, so that they are carried in with the others. The endless chains 23, provided with lateral arms or fingers 24, force the stalks farther back until they are compressed and severed by the disk cutters 14, the same operating with a shear cut and without the aid of other devices, as before described. It will be noted that the fixed guides between which the cornstalks are thus compressed project inward over the pivots of the cutters 14, so that the cornstalks are forced against the front edges of the cutters at a point where they intersect, and thereby the cutters are caused to rotate. The star-wheels 36 then come into action and move the severed stalks laterally inward until they pass by the inner angles of the vertical standards 1$^b$, when the pushers 37, which have a rotary reciprocating motion, force them directly backward into the passage-ways provided on the rear portion of the platform 1, between the central division thereof and the side wings 44. When thus moved backward upon the platform, the retarders 61 resist their advance to a degree measured by the weight 67, so that they are duly compacted to form a shock. At the same time the binding-cord *b* is drawn off, as shown in Fig. 1, and when a sufficient quantity of stalks has accumulated the machine is stopped and the cord severed and tied around the shock, which is then ready to be discharged. The operator then raises the lever 57, which rocks the shafts 69, and thereby throws the dischargers or skeleton frames 70 outward, as shown in Fig. 7, and at the same time closes the retarders 61, as there shown, and opens the side wings 44, whereby passage-ways are provided between the latter and the platform. The two side portions of the bifurcated shock being thus forced laterally at their base slide downward in the space provided and rest upon the ground, whereupon the machine is advanced, leaving the shock firmly braced in standing position. The operator now depresses the lever 57, and thereby closes the wings 44 and the dischargers 70, whereby the retarders are again raised, as shown in Fig. 3, and also drawn forward close to the vertical standard 1$^a$ in readiness to resume their function.

Having thus described my invention, what I claim as new, and desire to secure by Letters Patent, is—

1. A corn-harvester, provided with a cornstalk lifter and guide which is slidable in the direction of travel of the machine and is yieldable, whereby it may be pushed back upon meeting with a serious obstruction, substantially as shown and described.

2. A corn-harvester provided with a slidable stalk lifter and guide, and a spring which holds it normally projected but adapts it to yield in the manner shown and described.

3. In a corn-harvester, the combination with a lateral fixed guide for the stalks, of a stalk lifter and guide arranged at the front end of the fixed part, and adapted to slide therein, a pivoted link which serves as support for the lifter, a rod connected with the latter and adapted to slide in a fixed bearing, and a spiral spring applied to said rod and tending to force the lifter forward, but adapting it to yield to serious obstruction, substantially as shown and described.

4. In a corn-harvester, the combination, with fixed stalk-guides, endless carriers arranged in an inclined plane, and the motor-shaft arranged at other than a right angle to such plane, of a sprocket-wheel which is applied to said shaft and provided with a pendent flange and inwardly-projecting pins, a block or hub on the shaft having opposite vertical slots for receiving said pins, and the guide-flange on the fixed part of the frame with which the wheel-flange engages, substantially as shown and described, whereby the sprocket-wheel is adapted to rotate in an inclined plane while preserving its connection with the shaft, substantially as shown and described.

5. In a corn-harvester, the combination, with fixed guides between which the stalks pass backward, endless carriers for moving the stalks and arranged in an inclined plane, sprocket-wheels arranged in the same plane, a motor-shaft passing vertically through one of said wheels and such one being loosely connected therewith so that it is adapted to rotate in an inclined plane, and a spring bearing upon said wheel and holding it in normal engagement, substantially as shown and described.

6. In a corn-harvester, the combination, with a platform, and means for severing the standing stalks, of a packing device consisting of a rod bent at an acute angle and having a swinging fulcrum, a crank-shaft to which the other end of the rod is jointed, the angle of said rod being nearest the outer side of the platform, and means for operating the said shaft, whereby a rotary reciprocating movement is imparted to the pusher and the latter tends to push the stalks backward upon the platform and to crowd them inward upon the same or toward its central portion, substantially as shown and described.

7. In a corn-harvester, the combination, with a platform, and means for pushing the severed stalks backward thereon, of retarders for compacting the stalks into a bundle suitable to form a shock, the same consisting of arms hinged upon a slide and the latter mounted upon a fixed rod or guide, and a weight, and a cord connecting the same with the retarders, substantially as shown and described.

8. In a corn-harvester, the combination, with a platform, and means for pushing the severed stalks backward upon the same, of retarders for compacting them into a bundle to form a shock, the same consisting of arms adapted to project laterally and mounted upon a horizontal slide arranged along the center of the platform, a sleeve upon which the said arms are mounted, a cord connecting with such sleeve and passing over pulleys arranged upon the frame of the machine, a weight suspended by the cord from the upper pulley, and a guide for such weight, substantially as shown and described.

9. In a corn-harvester, the combination, with the platform, and means for pushing the severed stalks backward thereon, of means for forcing the butts of the stalks laterally off the platform, for the purpose of discharging the shock, the said means consisting of frames hung from a horizontal support, and means for swinging the lower ends of the same outward, substantially as shown and described.

10. In a corn-harvester, the combination, with the platform, and means for pushing the severed stalks backward thereon, of discharging devices consisting of frames hung upon horizontal shafts arranged centrally above the platform, the said shafts being provided with crank-arms, and a lever connected with said arms, whereby, upon moving the latter, the shafts are rocked and the discharging devices thereby swung outward to force the butts of the stalks off the platform, substantially as shown and described.

11. In a corn-harvester, the combination, with a platform, and means for pushing the stalks rearward thereon, of discharging devices consisting essentially of frames hung from horizontal supports, retarding devices arranged above such dischargers, and means for connecting the dischargers and retarders as shown and described, whereby as the dischargers are extended laterally the retarders are closed, and vice versa, substantially as shown and described.

12. In a corn-harvester, the combination, with a platform and means for forcing the stalks backward thereon, of stalk-discharging devices comprising frames, rock-shafts upon which said frames are hung so as to swing laterally, bars adapted to slide horizontally and hinged upon a guide above the dischargers, whereby they serve to retard the stalks when moved backward, fixed arms connecting such dischargers and retarders and crossing each other as described, and means for rocking the aforesaid shafts, whereby the dischargers and retarders are moved simultaneously in opposite directions laterally, so that one is opened as the other closes and vice versa, substantially as shown and described.

13. In a corn-harvester, the combination, with a platform upon which the severed stalks are received, of means for discharging the same laterally, said means consisting essentially of frames which swing outward, and means for operating them, substantially as shown and described.

14. In a corn-harvester, the combination, with a platform upon which the severed stalks are received, of retarders for compacting the stalks into a bundle to form a shock, and means for forcing the two parts of the shock simultaneously laterally, such retarders and dischargers being slidably connected and adapted to operate in opposite directions laterally, simultaneously, substantially as shown and described.

15. In a corn-harvester, the combination, with a platform upon which the severed stalks are moved rearward, of wings forming the sides of the guideways for the stalks, horizontal supports upon which the wings are pivoted at the top, a lever having a slidable connection with one end of the wings, and other lever mechanism for operating the first-named lever, whereby the lower ends of the wings are thrown outward when the shock is to be discharged, substantially as shown and described.

16. In a corn-harvester, the combination, with a platform upon which the severed stalks move rearwardly, of side wings for said platform, a rock-lever to which the said wings are hinged, the lever being fulcrumed in a fixed support and having an arm extended laterally, a second lever having a swinging fulcrum and jointed to the lateral arm of the first-named lever, and its lower end having a slidable connection with the aforesaid wing, and means for rocking the latter, whereby, when moved in one direction, its vertical arm is swung outward and its horizontal arm downward, the side wing being thereby swung outward at its lower end, substantially as shown and described.

17. In a corn-harvester, the combination, with the platform upon which the severed stalks are moved rearwardly, of side wings, crank-levers from whose horizontal upper arms the said wings are suspended, other levers having a fulcrum and jointed to the horizontal arm of the first-named lever, and a slidable connection with the wings, a rod extended downward from the first-named lever and serving to vibrate it for opening and closing the wings, a rock-shaft arranged along the platform and having arms connected with the aforesaid rod, and a lever by which the said shaft is rocked for operating the wings, substantially as shown and described.

18. In a corn-harvester, the combination, with a platform upon which the severed stalks are supported while being moved backward, of means for retarding stalks in such movement, means for discharging or pushing the same laterally off the platform, wings which form the normal sides of the platform, and means for operating such retarding and discharging devices and the said wings simultaneously, whereby the dischargers are swung laterally and the wings opened and the retarders closed at the same time, substantially as shown and described.

19. In a corn-harvester, the combination, with a platform upon which the severed stalks are supported while being moved backward, of transporting-wheels arranged on each side of the platform near the front, and a single transporting-wheel arranged in the center at the rear, and means for dividing the shock at the base and forcing its parts off the platform laterally, whereby the bifurcated shock passes off over the rear end of the platform and the wheel supporting it, substantially as shown and described.

20. In a corn-harvester, the combination, with a platform and vertical guides arranged thereon, of supports for a binding-cord which are adjustable vertically in said guides and adapted to be locked in any adjustment, the cord passing through eyes on said guides and extending from a suitable source of supply, a rod projecting vertically adjacent to the one of the guides, in due position to adapt it for temporary adjustment of the cord thereon, substantially as shown and described.

21. The combination with the gatherers of a corn-harvester, of idle rollers, supported in bearings secured to the top of the gatherers.

22. The combination with a corn-harvester gatherer, of an idle roller arranged longitudinally thereof, and bearings for said roller, one of which is arranged below the nose of the gatherer.

23. The combination with a corn-harvester gatherer, of an idle roller arranged longitudinally thereof, and bearings for said roller, one of which is secured below the nose of the gatherer, and the other secured to the upper side of the gatherer.

WILLIAM E. KOCH.

Witnesses:
T. W. BAUM,
MILO HARRISON.